(12) United States Patent
Kim et al.

(10) Patent No.: US 10,744,750 B2
(45) Date of Patent: Aug. 18, 2020

(54) SELECTIVE TRANSFER ROLL STAMP

(71) Applicant: KOREA INSTITUTE OF MACHINERY & MATERIALS, Daejeon (KR)

(72) Inventors: Kwangseop Kim, Daejeon (KR); Chan Kim, Daejeon (KR); Bongkyun Jang, Daejeon (KR); Jae-Hyun Kim, Daejeon (KR); Seung-Mo Lee, Daejeon (KR); Yun Hwangbo, Daejeon (KR)

(73) Assignee: KOREA INSTITUTE OF MACHINERY & MATERIALS, Daejeon (KR)

( * ) Notice: Subject to any disclaimer, the term of this patent is extended or adjusted under 35 U.S.C. 154(b) by 0 days.

(21) Appl. No.: 16/301,488

(22) PCT Filed: Nov. 29, 2016

(86) PCT No.: PCT/KR2016/013888
§ 371 (c)(1),
(2) Date: Nov. 14, 2018

(87) PCT Pub. No.: WO2017/200164
PCT Pub. Date: Nov. 23, 2017

(65) Prior Publication Data
US 2019/0308400 A1    Oct. 10, 2019

(30) Foreign Application Priority Data

May 20, 2016   (KR) ........................ 10-2016-0061913

(51) Int. Cl.
*B32B 37/00*    (2006.01)
*B41F 33/00*    (2006.01)
(Continued)

(52) U.S. Cl.
CPC ............ *B32B 37/025* (2013.01); *B41F 16/00* (2013.01); *B41F 31/00* (2013.01); *B41F 33/00* (2013.01); *B32B 2457/00* (2013.01)

(58) Field of Classification Search
USPC ....... 156/230, 538, 539, 540, 541, 556, 567, 156/571
See application file for complete search history.

(56) References Cited

U.S. PATENT DOCUMENTS

2009/0217515 A1*   9/2009   Aoyama ......... G06K 19/07718
29/832

FOREIGN PATENT DOCUMENTS

JP    2003-224088    8/2003
JP    2004-202053    7/2004
(Continued)

OTHER PUBLICATIONS

Machine translation of KR 10-1521205 (Year: 2020).*

*Primary Examiner* — Sing P Chan
(74) *Attorney, Agent, or Firm* — Lex IP Meister, PLLC

(57) ABSTRACT

A selective transfer roll stamp is provided which rotates on a source substrate to selectively transfer elements arranged on the source substrate. The selective transfer roller stamp includes: a roller unit rotating about an axis of rotation and including projecting portions protruding in a radial direction and recessed portions formed between neighboring projecting portions; and an adhesive layer formed on the outer circumferential surface of the roller unit and coming into contact with the elements, wherein the outer circumferential surface of the adhesive layer is made flat in a circumferential direction.

8 Claims, 8 Drawing Sheets

(51) Int. Cl.
*B41F 31/00* (2006.01)
*B41F 16/00* (2006.01)
*B32B 37/12* (2006.01)

(56) References Cited

FOREIGN PATENT DOCUMENTS

| | | |
|---|---|---|
| JP | 2014-088245 | 5/2014 |
| KR | 10-0837339 | 6/2008 |
| KR | 10-0904694 | 6/2009 |
| KR | 10-1521205 | 5/2015 |
| KR | 10-2015-0169729 | 3/2017 |

* cited by examiner (a)

(b)

SELECTIVE TRANSFER ROLL STAMP

TECHNICAL FIELD

The present invention relates to a selective transfer roll stamp, and more particularly, to a selective transfer roll stamp capable of controlling adhesive force of an adhesive layer and transferring micro-elements.

BACKGROUND ART

There have been attempts to fabricate flexible elements and components based on printed electronics technology, and printed electronics is increasingly used, mostly in product ranges such as displays, RFID, and solar power. In printed electronics, printing usually occurs at a lower temperature than a semiconductor process or at room temperature. Elements are fabricated by a coating process, a printing process, a patterning process, etc., and flexible components can be made via a post-process for forming wiring and electrodes and processes like joining and cutting.

In the actual fabrication of devices using elements, space for wiring and other uses is needed. That is, space is needed between each device, but cannot be formed if all elements arranged on a wafer are transferred at once, which makes device fabrication difficult.

Moreover, for a device consisting not of a single type of element but of multiple types of elements, one element is transferred first, and then another element is transferred near it. As can be seen from this example, a transfer process for device fabrication often requires a process of selectively transferring an element, and there is an already known technique for selective transfer using a patterned stamp in the transfer process.

FIG. 1 is a view showing an example of a conventional selective transfer roll stamp, and FIG. 2 is an enlarged view of protrusions on the selective transfer roll stamp of FIG. 1.

Referring to FIG. 1 and FIG. 2, the conventional selective transfer roll stamp includes a roller 20 rotating about the axis of rotation, and an adhesive layer 30 covering the roller 20. Protrusions 31 are formed on the surface of the adhesive layer 30, and flat portions 32 are formed between neighboring protrusions 31. A plurality of elements 1 arranged on a source substrate 10 are separated from the source substrate 10 as they are attached to the protrusions 31 on the rotating stamp.

However, as shown in FIG. 2, in a case where a contact load F is applied in the process of transferring elements 1 on the source substrate 10 to the stamp, the flat portions 32, as well as the protrusions 31 on the stamp, may collapse, leading to the risk of bringing the flat portions 32 into contact with the elements 1 on the source substrate 10. In that case, the elements 1 are transferred to the stamp, which should not happen, and this makes the whole process defective.

As the size and pitch of the protrusions 31 become smaller, the flat portions 32 collapse more frequently, especially when transferring micro-sized elements 1, thus leading to a further decrease in process defect rates.

Moreover, the conventional selective transfer roll stamp should be replaced often because the protrusions wear out or become damaged over a long-time process.

DISCLOSURE

Technical Problem

The present invention has been made in an effort to provide a selective transfer roll stamp capable of decreasing process defect rates and reducing the cost of replacing stamps due to an increased lifespan of the stamp, by forming a flat contact surface between an adhesive layer and elements and fitting a base member with protrusions or recesses into the adhesive layer so as to partially control adhesive force using variations in the thickness of the adhesive layer.

Technical Solution

An exemplary embodiment of the present invention provides a selective transfer roll stamp which rotates on a source substrate to selectively transfer elements arranged on the source substrate, the selective transfer roller stamp including: a roller unit rotating about an axis of rotation and including projecting portions protruding in a radial direction and recessed portions formed between neighboring projecting portions; and an adhesive layer formed on the outer circumferential surface of the roller unit and coming into contact with the elements, wherein the outer circumferential surface of the adhesive layer is made flat in a circumferential direction.

The adhesive layer includes first adhesive portions formed above the projecting portions and having a first thickness and second adhesive portions formed above the recessed portions and having a second thickness, wherein the first adhesive portions have a larger adhesive force than the second adhesive portions so that the elements are attached to the first adhesive portions but not to the second adhesive portions, when the roller unit rotates to cause the adhesive portions to come into contact with the elements.

The roller unit may include: a roller having a cylindrical shape; and a protrusion substrate coupled to the outer circumferential surface of the roller, with the projecting portions and recessed portions formed on the surface.

The selective transfer roll stamp may further include a controller for controlling the rotation speed of the roller unit, wherein the controller controls the adhesive force between the adhesive layer and the elements by varying the rotation speed of the roller unit.

The projecting portions or the recessed portions may have a triangular cross-section.

The projecting portions may be made in a linear pattern so as to be elongated in a direction parallel to the axis of rotation.

The projecting portions may be made in a pattern of dots spaced apart in a direction parallel to the axis of rotation.

The protrusion substrate may be detachably installed to the roller.

The protrusion substrate may be formed from a flexible polymer.

According to an embodiment of the present invention, the selective transfer roll stamp may decrease process defect rates and reduce the cost of replacing stamps due to an increased lifespan of the stamp.

Advantageous Effects

According to an embodiment of the present invention, the selective transfer roll stamp may facilitate the fabrication process and reduce fabrication costs.

Furthermore, according to an exemplary embodiment of the present invention, the selective transfer roll stamp may be used in the process of transferring micro-sized elements.

MODE FOR INVENTION

Figure 1:
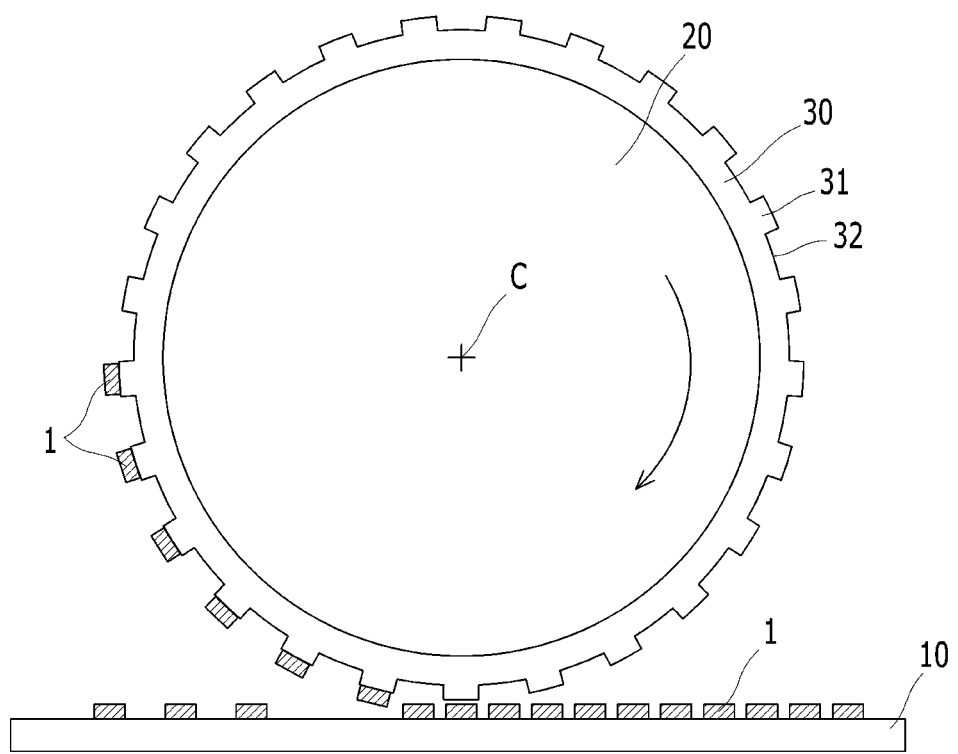
FIG. 1 is a view showing an example of a conventional selective transfer roll stamp.
Figure 2:
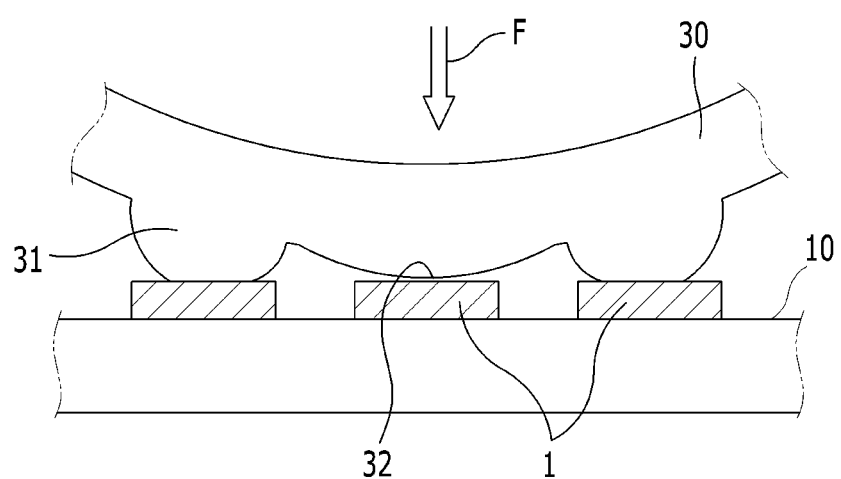
FIG. 2 is an enlarged view of protrusions on the selective transfer roll stamp of FIG. 1.

Hereinafter, the present invention concept will be described in detail with reference to the accompanying drawings so that those skilled in the technical field to which the present inventive concept pertains may easily carry out the present invention. As those skilled in the art would realize, the described embodiments may be modified in various different ways, all without departing from the spirit or scope of the present invention.

The drawings and description are to be regarded as illustrative in nature and not restrictive. Like reference numerals designate like elements throughout the specification.

Furthermore, as the size and thickness of the respective structural components shown in the drawings are arbitrarily illustrated for explanatory convenience, the present invention is not necessarily limited to the illustrated sizes and thicknesses.

Throughout this specification and the claims that follow, when it is described that an element is "coupled" to another element, the element may be directly coupled to the other element or indirectly coupled to the other element through a third element. In addition, unless explicitly described to the contrary, the word "comprise" and variations such as "comprises" and "comprising" will be understood to imply the inclusion of stated elements but not the exclusion of any other elements.

Hereinafter, exemplary embodiments of a selective transfer roll stamp according to the present invention will be described in details with reference to the accompanying drawings.

Figure 3:
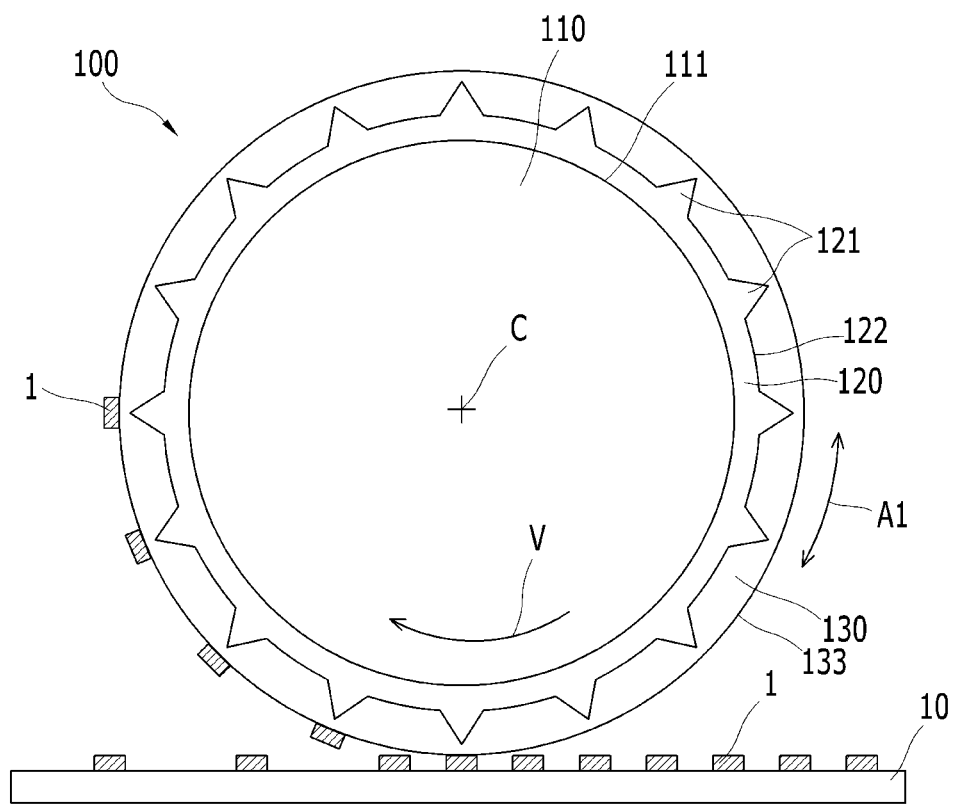
FIG. 3 is a view showing a selective transfer roll stamp according to a first exemplary embodiment of the present invention.
Figure 4:
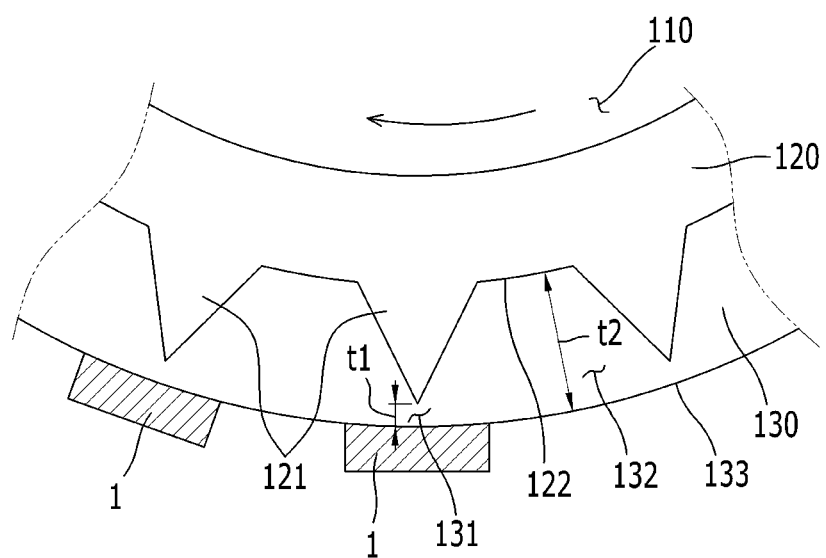
FIG. 4 is an enlarged view of protrusions on the selective transfer roll stamp of FIG. 3.
Figure 5:
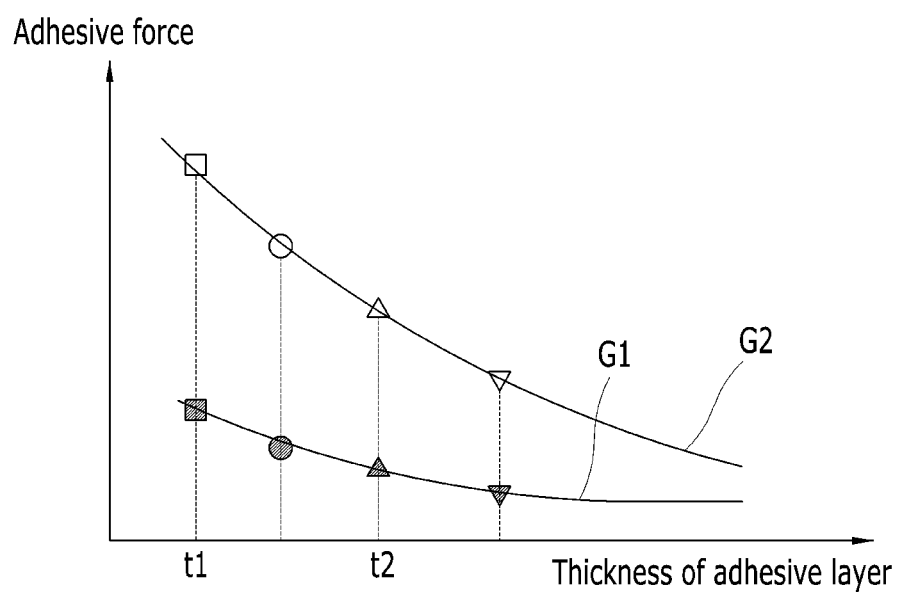
FIG. 5 is a graph showing variations in adhesive force with thickness of an adhesive layer.
Figure 6:
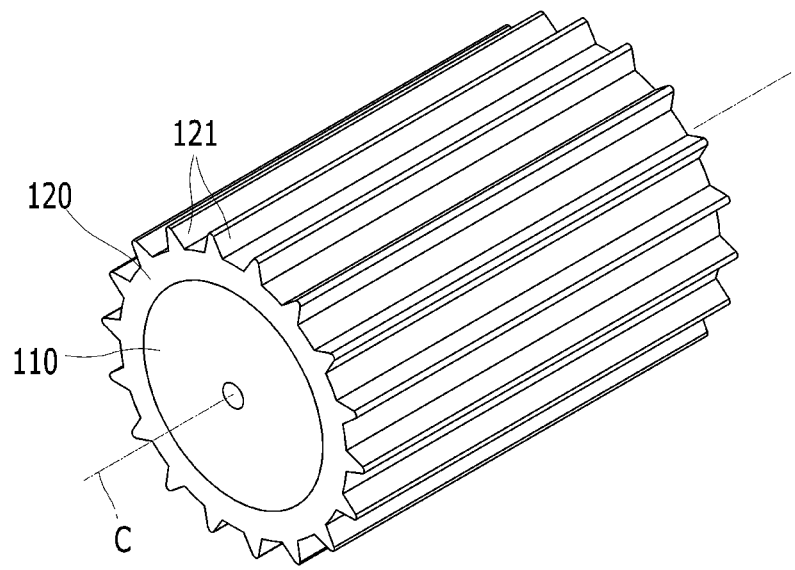
FIG. 6 is a view explaining the shape of the protrusions on the selective transfer roll stamp of FIG. 3.
Figure 6:
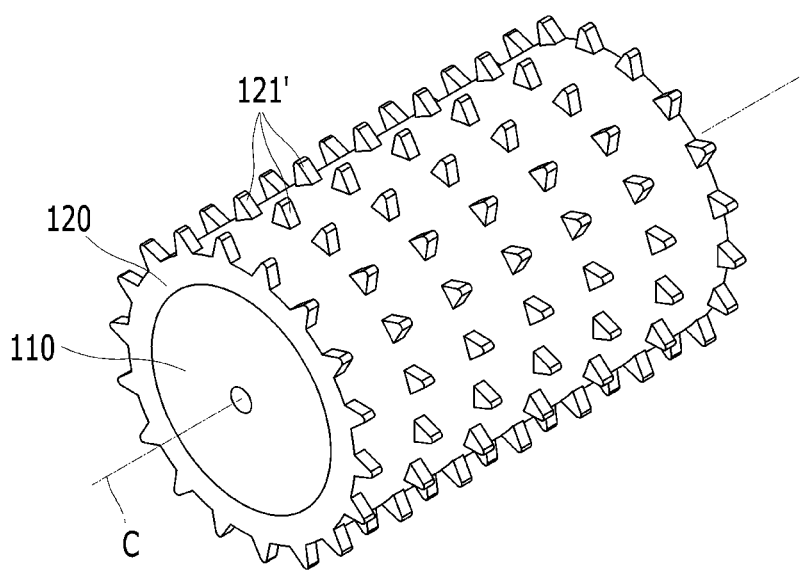

FIG. 3 is a view showing a selective transfer roll stamp according to a first exemplary embodiment of the present invention, FIG. 4 is an enlarged view of protrusions on the selective transfer roll stamp of FIG. 3, FIG. 5 is a graph showing variations in adhesive force with thickness of an adhesive layer, and FIG. 6 is a view explaining the shape of the protrusions on the selective transfer roll stamp of FIG. 3.

Referring to FIG. 3 to FIG. 6, the selective transfer roll stamp 100 according to the present exemplary embodiment may transfer micro-elements by partially controlling adhesive force using variations in the thickness of the adhesive layer, and includes a roller 110, a protrusion substrate 120, an adhesive layer 130, and a controller (not shown).

The roller 110 is installed to rotate about the axis of rotation C. The axis of rotation C of the roller 110 is connected to a rotary driver (not shown) like a motor, and the adhesive layer 130, which is to be described later, comes into contact with elements 1 arranged on a source substrate 10 one after another as the roller 110 is rotated by the driving force of the rotary driver.

The roller 110 has a cylindrical shape and may be made of a material such as SUS, but the material of the roller 110 is not specifically limited, and any material may be used as long as the material has a level of durability that withstands a load applied when the selective transfer roll stamp 100 comes into contact with the elements 1 and supports the rotation of the roller 110.

The protrusion substrate 120 is coupled to an outer circumferential surface 111 of the roller, and has projecting portions 121 and recessed portions 122.

The projecting portions 121 protrude radially from the surface of the protrusion substrate 120 and are spaced out in a circumferential direction A1. The intervals at which the projecting portions 121 are spaced out in the circumferential direction A1 are determined by the pitch between the elements 1 desired to be separated from the source substrate 10.

The recessed portions 122 are formed between neighboring projecting portions 121 on the surface of the protrusion substrate 120.

The protrusion substrate 120 of the present exemplary embodiment may be molded from a flexible polymer such as a UV-curable polymer, polyurethane, or PET, and, after the molding, the protrusion substrate 120 is detachably coupled to the outer circumferential surface 111 of the roller.

If the pitch between the elements 1 desired to be separated from the source substrate 10 is changed, the protrusion substrate 120 may be remanufactured by re-adjusting the pitch between the projecting portions 121 according to the changed pitch between the elements 1. The protrusion substrate 120 where the pitch between the projecting portions 121 is changed may be attached to the outer circumferential surface 111 of the roller and used in the transfer process.

Thus, if the pitch between the elements 1 desired to be separated from the source substrate 10 is changed, the change may be dealt with since the protrusion substrate 120 is detachably coupled to the outer circumferential surface 111 of the roller. That is, such changes may be dealt with simply by replacing the protrusion substrate 120 made of a polymer, without needing to replace the roller 110 usually made of a metal, thereby facilitating the fabrication process and reducing fabrication costs.

As shown in FIG. 3 and FIG. 4, the projecting portions 121 according to the present exemplary embodiment may have a triangular cross-section.

The selective transfer roll stamp 100 according to the present exemplary embodiment may be used to make layered metamaterials, for example, to transfer micro-sized elements 1. Hence, it is preferable to make the contact area with the elements 1 as small as possible. However, if the protrusions 31 have a rectangular cross-section as shown in FIG. 1, neighboring elements 1 not desired to be separated may be attached to the protrusions 31 when the protrusions 31 come into contact with the micro-sized elements 1.

Accordingly, only the elements 1 desired to be transferred in the process of transferring the micro-sized elements 1 may be separated by making the cross-section of the projecting portions 121 triangular so that the contact area with the elements 1 are made as small as possible.

The projecting portions 121 according to the present exemplary embodiment may be made in a linear pattern so as to be elongated in a direction parallel to the axis of rotation C, as shown in (a) of FIG. 6, or may be made in a pattern of dots 121' spaced apart in a direction parallel to the axis of rotation C, as shown in (b) of FIG. 6.

The adhesive layer 130 is formed to cover the protrusion substrate 120 and has a flat contact surface 133 that comes into contact with the elements 1 arranged on the source substrate 10, and includes first adhesive portions 131 and second adhesive portions 132.

The adhesive layer 130 according to the present invention is characterized in that the contact surfaces 133 making contact with the elements 1 arranged on the source substrate 10 are made flat. As shown in FIG. 1, a conventional adhesive layer 30 is formed in such a way that the protrusions 31 protrude from the surface to come into contact with the elements 1, whereas, in contrast, the adhesive layer 130 according to the present invention has no protruding portions in outward appearance, with the contact surface 133 made flat on the whole in the circumferential direction A1.

However, it should be noted that, as described below, the adhesion force of the adhesive layer 130 to the elements 1 may be controlled by varying the thickness of the adhesive layer 130.

The first adhesive portions 131 are formed above the projecting portions 121 of the protrusion substrate 120, and have a first thickness t1 that is thinner than a second thickness t2. The second adhesive portions 132 are formed above the recessed portions 122 of the protrusion substrate 120, and have a second thickness t2 that is thicker than the first thickness t1. That is, the first adhesive portions 131 are made thinner than the second adhesive portions 132.

Referring to FIG. 5, the variations in adhesive force with thickness of the adhesive layer 130 show that the thinner the adhesive layer 130, the larger the adhesive force of the adhesive layer 130. That is, the adhesive force of the first adhesive portions 131 which are thinner is larger than the adhesive force of the second adhesive portions 132 which are thicker.

Accordingly, the material of the adhesive layer 130 is chosen in such a way that the elements 1 on the source substrate 10 are attached to the first adhesive portions 131 but not to the second adhesive portions 132, or the rotation speed of the roller 110 is controlled. By doing so, the elements 1 are attached to the first adhesive portions 131 which have a larger adhesive force but not to the second adhesive portions 142 which have a smaller adhesive force, even if the elements 1 on the source substrate 10 come into contact with the flat contact surface 133 of the adhesive layer 130.

The controller (not shown) controls the rotation speed v of the roller 110.

Referring to FIG. 5, the graph shows a line G1 representing variations in adhesive force with thickness of the adhesive layer 130 when the rotation speed v of the roller 110 is slower and a line G2 representing variations in adhesive force with thickness of the adhesive layer 130 when the rotation speed v of the roller 110 is faster.

As shown in FIG. 5, it can be seen that, if the adhesive layer 130 has a constant thickness t1 or t2, the adhesive force is larger when the rotation speed of the roller 110 is faster compared to when the rotation speed of the roller 110 is slower.

Based on the principle that adhesive force varies with rotation speed v, the adhesive force between the adhesive layer 130 and the elements 1 to be transferred may be varied by varying the rotation speed v of the roller 110 by the controller.

It is important that the first adhesive portions 131 and the second adhesive portions 132 are configured to have an adhesive force that causes the elements 1 to be attached to the first adhesive portions 131 and keeps them from being attached to the second adhesive portions 132, in order that the elements 1 are selectively transferred by the first adhesive portions 131 alone. The elements 1 may be attached to both of the first adhesive portions 131 and second adhesive portions 132 or neither of them at a certain particular rotation speed v.

If the elements 1 are attached to both of the first adhesive portions 131 and second adhesive portions 132 or neither of them, the adhesive force of the first adhesive portions 131 and the adhesive force of the second adhesive portions 132 may be adjusted by varying the rotation speed v of the roller 110.

By increasing or decreasing the rotation speed v of the roller 110, the adhesive force of the first adhesive portions 131 and the adhesive force of the second adhesive portions 132 may be varied in such a way as to cause the elements 1 to be attached to the first adhesive portions 131 and keep them from being attached to the second adhesive portions 132.

Figure 7:
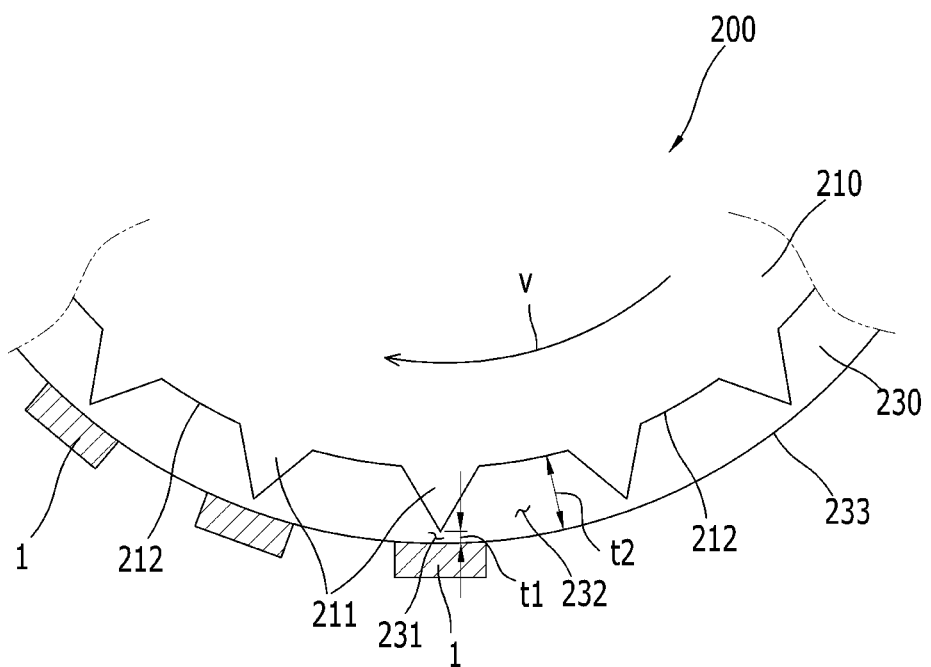
FIG. 7 is a view showing part of a selective transfer roll stamp according to a second exemplary embodiment of the present invention.

FIG. 7 is a view showing part of a selective transfer roll stamp according to a second exemplary embodiment of the present invention. In FIG. 7, the members denoted by the same reference numerals as the members shown in FIGS. 3 to 6 have the same configurations and functions, so detailed descriptions of them will be omitted.

Referring to FIG. 7, a selective transfer roll stamp 200 according to the present exemplary embodiment is characterized that projecting portions 211 and recessed portions 212 are formed directly on the surface of a roller 210.

While the exemplary embodiment illustrated in FIG. 3 shows that the protrusion substrate 120 made of a polymer and formed with the projecting portions 121 and the recessed portions 122 is coupled to the roller 110 of made of a metal, this exemplary embodiment shows that the projecting portions 211 and the recessed portions 212 are formed directly on the surface of the roller 210 made of a metal.

Accordingly, an adhesive layer 230 is formed to cover the roller 210, has a flat contact surface 233 that comes into contact with the elements 1 arranged on the source substrate 10, and includes first adhesive portions 231 and second adhesive portions 232.

The first adhesive portions 231 are formed above the projecting portions 211 of the roller 210, and have a first thickness t1 that is thinner than a second thickness t2. The second adhesive portions 232 are formed above the recessed portions 212 of the roller 210 and have a second thickness t2 that is thicker than the first thickness t1. That is, the first adhesive portions 231 are made thinner than the second adhesive portions 232.

In this way, the selective transfer roll stamp 200 with the projecting portions 211 and recessed portions 212 formed directly on the surface of the roller 210 may be fabricated without fabricating the protrusion substrate 120.

Further, the first adhesive portions 231 and the second adhesive portions 232 are configured in such a way that the first adhesive portions 231 have a larger adhesive force than the second adhesive portions 232 due to the thickness difference and the elements 1 are attached to the first adhesive portions 231 but not to the second adhesive portions 232, which is substantially the same as explained with respect to the exemplary embodiment illustrated in FIG. 3.

Figure 8:
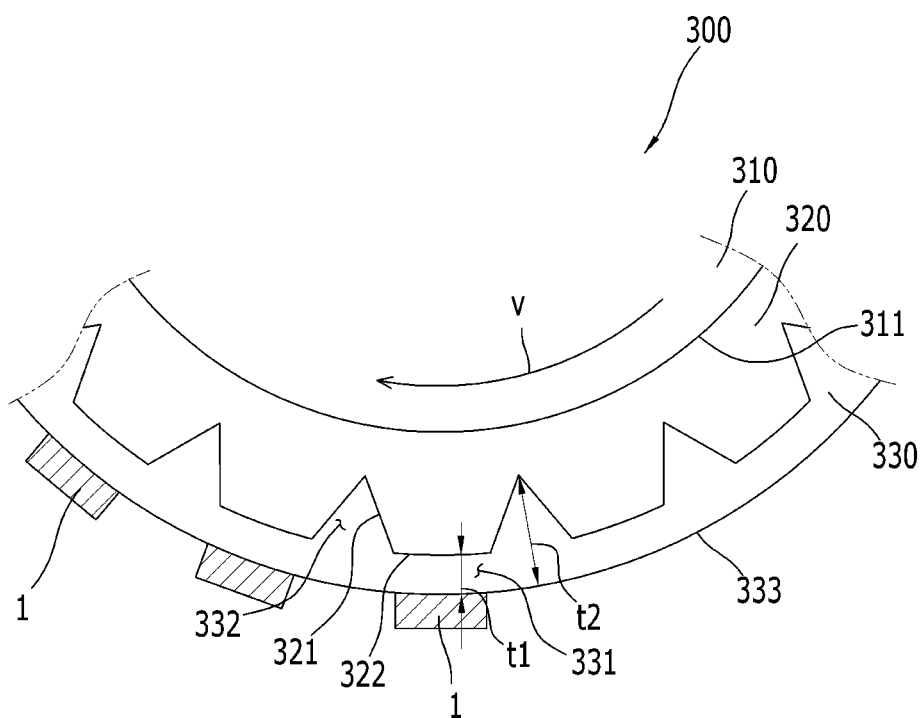
FIG. 8 is a view showing part of a selective transfer roll stamp according to a third exemplary embodiment of the present invention.

FIG. 8 is a view showing part of a selective transfer roll stamp according to a third exemplary embodiment of the present invention. In FIG. 8, the members denoted by the same reference numerals as the members shown in FIGS. 3 to 6 have the same configurations and functions, so detailed descriptions of them will be omitted.

Referring to FIG. 8, a selective transfer roll stamp 300 according to the present exemplary embodiment is characterized in that a protrusion substrate 320 is coupled to a rotating roller 310 and recessed portions 321 and projecting portions 322 are formed directly on the surface of the protrusion substrate 320.

The protrusion substrate 320 is coupled to an outer circumferential surface 311 of the roller, and has the recessed portions 321 and projecting portions 322.

The recessed portions 321 protrude radially from the surface of the protrusion substrate 320 and are spaced out in the circumferential direction A1.

The projecting portions 322 are formed between neighboring recessed portions 321 on the surface of the protrusion substrate 320. The intervals at which the projecting portions 322 are spaced out in the circumferential direction A1 are determined by the pitch between the elements 1 desired to be separated from the source substrate 10.

The protrusion substrate 320 of the present exemplary embodiment may also be molded from a flexible polymer such as a UV-curable polymer, polyurethane, or PET, and, after the molding, the protrusion substrate 320 is detachably coupled to the outer circumferential surface 311 of the roller.

The adhesive layer 330 is formed to cover the protrusion substrate 320 has a flat contact surface 333 that comes into contact with the elements 1 arranged on the source substrate 10, and includes first adhesive portions 331 and second adhesive portions 332.

The first adhesive portions 331 are formed above the projecting portions 322 of the protrusion substrate 320, and have a first thickness t1 that is thinner than a second thickness t2. The second adhesive portions 332 are formed above the recessed portions 321 of the protrusion substrate 320 and have a second thickness t2 that is thicker than the first thickness t1. That is, the first adhesive portions 331 are made thinner than the second adhesive portions 332.

Further, the first adhesive portions 331 and the second adhesive portions 332 are configured in such a way that the first adhesive portions 331 have a larger adhesive force than the second adhesive portions 332 due to the thickness difference and the elements 1 are attached to the first adhesive portions 331 but not to the second adhesive portions 332, which is substantially the same as explained with respect to the exemplary embodiment illustrated in FIG. 3.

While FIG. 8 illustrates that the protrusion substrate 320 is coupled to the rotating roller 310, the selective transfer roll stamp may be fabricated in such a way that the projecting portions 321 and the recessed portions 322 are formed directly on the surface of the roller 310.

Configured as above, the selective transfer roll stamp may decrease process defect rates and reduce the cost of replacing stamps due to an increased lifespan of the stamp, by forming a flat contact surface between an adhesive layer and elements and partially controlling adhesive force using variations in the thickness of the adhesive layer.

Moreover, the selective transfer roll stamp configured as above according to the present invention may facilitate the fabrication process and reduce fabrication costs because changes in the pitch between the elements can be dealt with simply by replacing the protrusion substrate made of a polymer, without needing to replace the roller usually made of a metal.

Furthermore, the selective transfer roll stamp configured as above according to the present invention may be used in the process of transferring the micro-sized elements, by making the cross-section of the projecting portions triangular so that the contact area with the elements are made as small as possible.

The scope of the present invention is not limited to the above-described embodiments and modifications, but may be implemented in various embodiments within the appended claims. Those of ordinary skill in the art may recognize that modifications of the embodiments disclosed herein are possible without departing from the subject matter of the invention and all such modifications are deemed to fall within the purview of the present invention, as defined by the claims.

DESCRIPTION OF SYMBOLS

1: element
10: source substrate
100: selective transfer roll stamp
120: protrusion substrate
121: projecting portion
122: recessed portion
130: adhesive layer
131: contact surface

The invention claimed is:

1. A selective transfer roll stamp which rotates on a source substrate to selectively transfer elements arranged on the source substrate, the selective transfer roller stamp comprising:
   a roller unit rotating about an axis of rotation and including projecting portions protruding in a radial direction and recessed portions formed between neighboring projecting portions; and
   an adhesive layer formed on an entire outer circumferential surface of the roller unit and coming into contact with the elements,
   wherein an entire outer circumferential surface of the adhesive layer is made flat in a circumferential direction,
   wherein the adhesive layer comprises first adhesive portions formed above the projecting portions and having a first thickness and second adhesive portions formed above the recessed portions and having a second thickness, and
   wherein the first adhesive portions have a larger adhesive force than the second adhesive portions so that the elements are attached to the first adhesive portions but not to the second adhesive portions, when the roller unit rotates to cause the adhesive portions to come into contact with the elements.

2. The selective transfer roll stamp of claim 1, wherein the roller unit comprises:
   a roller having a cylindrical shape; and
   a protrusion substrate coupled to the outer circumferential surface of the roller, with the projecting portions and recessed portions formed on the surface.

3. The selective transfer roll stamp of claim 2, wherein the protrusion substrate is detachably installed to the roller.

4. The selective transfer roll stamp of claim 3, wherein the protrusion substrate is formed from a flexible polymer.

5. The selective transfer roll stamp of claim 1, further comprising a controller for controlling the rotation speed of the roller unit,
   wherein the controller controls the adhesive force between the adhesive layer and the elements by varying the rotation speed of the roller unit.

6. The selective transfer roll stamp of claim 1, wherein the projecting portions or the recessed portions have a triangular cross-section.

7. The selective transfer roll stamp of claim 1, wherein the projecting portions are made in a linear pattern so as to be elongated in a direction parallel to the axis of rotation.

8. The selective transfer roll stamp of claim 1, wherein the projecting portions are made in a pattern of dots spaced apart in a direction parallel to the axis of rotation.

\* \* \* \* \*